United States Patent [19]

Curry et al.

[11] 4,197,173

[45] Apr. 8, 1980

[54] PHOTOCURABLE POLYENE-POLYTHIOL-SILOXANE-POLYESTER COMPOSITION FOR COATING

[75] Inventors: Herbert L. Curry, Lenox, Mass.; Walter L. Hall, Mt. Vernon, Ind.

[73] Assignee: General Electric Company, Pittsfield, Mass.

[21] Appl. No.: 952,679

[22] Filed: Oct. 19, 1978

[51] Int. Cl.$^2$ .......................... C08F 2/46; C08F 30/08
[52] U.S. Cl. .......................... 204/159.13; 204/159.15; 204/159.18; 428/447; 428/500; 428/412; 525/437; 525/479; 427/54.1
[58] Field of Search .................. 260/827; 204/159.13; 427/44, 54

[56] References Cited

U.S. PATENT DOCUMENTS

| | | | |
|---|---|---|---|
| 3,661,744 | 5/1972 | Kehr et al. | 204/159.14 |
| 3,664,937 | 5/1972 | Fuhr et al. | 204/159.15 |
| 3,873,499 | 3/1975 | Michael et al. | 260/46.5 E |
| 3,919,438 | 11/1975 | Urkevich | 427/54 |
| 4,016,333 | 4/1977 | Gaske et al. | 428/447 |
| 4,064,286 | 12/1977 | Hahn | 427/44 |

*Primary Examiner*—Richard B. Turer
*Attorney, Agent, or Firm*—Myron B. Kapustij; William F. Mufatti

[57] ABSTRACT

A photocurable coating composition suitable for coatings comprising (i) a polythiol, (ii) a polyene, and (iii) a silicone-modified polyester copolymer. These coating compositions are suitable for coating polycarbonate articles.

8 Claims, No Drawings

PHOTOCURABLE POLYENE-POLYTHIOL-SILOXANE-POLYESTER COMPOSITION FOR COATING

This invention is directed to a photocurable coating composition suitable for coatings comprising (i) a polythiol, (ii) a polyene, and (iii) a silicone modified polyester copolymer. These coating compositions are suitable for coating polycarbonate articles and have good adhesion thereto.

BACKGROUND OF THE INVENTION

Commercial liquid coating compositions are available. Many of these coating compositions are not suitable for coating polycarbonate articles since they are not compatible with the polycarbonate. Also, the uncured coating may adversely affect the polycarbonate article by stress cracking and crazing it, by causing crack propogation into the polycarbonate as a result of brittleness of the coating itself and/or by reducing the properties of the polymer generally such as, for example, impact resistance, elongation, tensile strength and so on. Further, several coatings while compatible with the polycarbonate have little or no chemical barrier properties and/or poor adhesion.

Therefore, a successful coating for polycarbonate articles must be compatible with the polycarbonate and provide barrier or other desirable surface properties while maintaining mechanical or other properties of the polymer substrate and themselves provide chemically resistant surfaces. Also, the cured coating, in this particular application, should particularly provide the coated polycarbonate article with anti-skid properties in addition to the chemical barrier properties necessary to prevent crazing of the substrate polycarbonate in chemically aggressive environments and have improved adhesion to the polycarbonate substrate.

U.S. Pat. No. 4,082,891 discloses photocurable compositions suitable for coatings comprising a polythiol and two different polyenes and polycarbonate articles coated therewith. The instant invention provides coating compositions having good anti-skid properties and good adhesion to a polycarbonate substrate.

DESCRIPTION OF THE INVENTION

The instant invention is concerned with a photocurable composition suitable for coating polycarbonate articles comprising: (i) a polythiol, (ii) a polyene, and (iii) a silicone modified polyester copolymer. These coating compositions are especially suitable for coating polycarbonates. Upon curing, the coatings have improved adhesion to the polycarbonate substrate and provide a polycarbonate article with anti-skid properties, chemical resistance, scratch resistance and chemical barrier properties resulting in stress-crazing resistance. Also, the coating composition of the instant invention allows the polycarbonate substrate to retain its inherent desirable physical properties (particularly impact resistance) by which it is distinguished.

The photocurable coating composition comprises:
(i) a polythiol represented by the general formula:

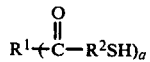

wherein $R^1$ and $R^2$ are organic moieties containing no reactive carbon-to-carbon unsaturation and a is 2 to 4;
(ii) a polyene represented by the general formula:

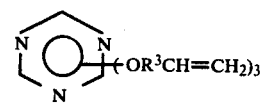

wherein $R^3$ is an organic moiety containing no reactive carbon-to-carbon unsaturation; and (iii) a silicone modified polyester which is the reaction product of a hydroxyl terminated unsaturated polyester of a polycarboxylic acid reactant wherein at least about 65 mole % of the polycarboxylic acid reactant is an α, β-ethylenically unsaturated polycarboxylic acid reactant and an alcohol which contains two terminal hydroxyl groups and allyl ether and/or methallyl ether groups, and an organopolysiloxane containing at least 0.25% by weight of groups reactive with the hydroxyl functional groups of the polyester.

The polythiols of (i) are prepared by reacting an ester of thiol containing acids of the formula HS—R²—COOH, wherein $R^2$ is an organic moiety containing no reactive carbon-to-carbon unsaturation, with polyhydroxy compounds of structure $R^1(OH)_a$ wherein $R^1$ is an organic moiety containing no reactive carbon-to-carbon unsaturation and a is 2 to 4. These components react under conditions known in the art and as are set forth in U.S. Pat. No. 3,661,744, which is incorporated herein by reference. Preferably, the polythiol of (i) has the following general formula:

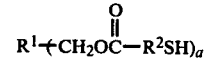

wherein $R^1$ and $R^2$ are straight chain aliphatic moieties containing no reactive carbon-to-carbon unsaturation and a is 2 to 4. Preferred straight chain aliphatic moieties are those containing from 1 to about 20 carbon atoms.

The polyenes of (ii) are prepared by methods known in the art and as set forth in U.S. Pat. No. 3,661,744, which is incorporated herein by reference. Preferred polyenes of type (ii) have the following general formula:

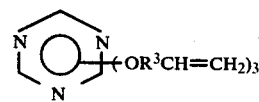

wherein $R^3$ is an organic moiety containing no reactive carbon-to-carbon unsaturation. Preferably, $R^3$ is a straight chain aliphatic moiety containing no reactive carbon-to-carbon unsaturation and containing from 1 to about 20 carbon atoms.

The silicone modified polyesters of (iii) are the reaction products of:
A. a hydroxyl terminated unsaturated polyester of:
   1. a polycarboxylic acid reactant wherein at least about 65 mole % of the polycarboxylic acid reactant is an α, β-ethylenically unsaturated polycarboxylic acid reactant and up to about 35 mole % of the polycarboxylic acid reactant is a polycarboxylic acid reactant free from non-benzenoic unsaturation; and
2. an alcohol reactant containing two terminal hydroxyl groups and allyl ether groups and/or methallyl ether groups in an amount sufficient to provide at least 0.1 mole of allyl ether groups and/or methallyl ether groups per mole of said ethylenically unsaturated polycarboxylic acid reactant; and
3. wherein said polyester has an acid number from about 10 to about 35; and B. an organopolysiloxane having the average unit formula:

$$(OH)_q(OR')_rR_sSiO_{(4-q-r-s)/2}$$

wherein R is lower alkyl radical having 1 to 8 carbon atoms; and/or cycloalkyl radical having 5 to 7 carbon atoms in the ring; and/or lower alkenyl radical having 2 to 8 carbon atoms; and/or mononuclear aryl radical; and/or mononuclear aryl lower alkyl radical having 1 to 6 carbon atoms in the alkyl group; and/or halogenated derivatives of the above radicals; R' is alkyl containing from 1 to 8 carbon atoms per radical; and/or aryl; and/or acyl of 1 to 8 carbon atoms; s has a value of 1 to 2; q has a value of 0 to 1.0; r has a value of 0 to 1.0; and the sum of q+r has a value of 0.01 to 1; and containing at least 0.25% by weight of silicon-bonded OH and/or OR' groups.

These silicone-polyester copolymers and the process for their production are known in the art and are set forth in U.S. Pat. No. 3,919,438, which is incorporated herein by reference.

The relative amounts of unsaturated polyester and organopolysiloxane are generally from about 90 to about 40% by weight of unsaturated polyester and correspondingly from about 10 to about 60% by weight of organopolysiloxane based upon the combined weight of the polyester and organopolysiloxane. The preferred relative quantities of polyester to organopolysiloxane employed in the copolymers of the present invention are from about 70% to about 50% by weight of unsaturated polyester and correspondingly from about 30 to about 50% by weight of organopolysiloxane based upon the combined weight of the polyester and organopolysiloxane.

The copolymers of the present invention are prepared by copolymerizing a preformed unsaturated polyester of the type described above with the required polysiloxane to effect a transesterification between the reactants. The ester interchange reaction is carried out in the presence of a reaction diluent which is inert to the reaction (does not adversely affect either the reactants or the product). Suitable reaction diluents include aromatic hydrocarbons such as xylene, benzene, and toluene; and esters such as ethyl acetate and Cellosolve acetate.

The preferred diluents are the aromatic hydrocarbons. The diluent is usually employed in amounts of at least about 1 part by weight per 4 parts of reactants and preferably at least about 1 part by weight per 3 parts of reactants. The maximum quantity of diluent is limited only by economical and practical considerations such as equipment capacities.

In addition, it is preferred to carry out the transesterification in the presence of an esterification catalyst. Examples of such catalysts include the metallic esters of the general formula $M(OR^4)_4$ wherein M is a titanium atom or a zirconium atom and each $R^4$ is a monovalent hydrocarbon radical or an acyl radical. The substituents represented by $R^4$ can be alkyl, aryl, alkenyl, aralkyl, alkaryl, and acyl. The $R^4$ substituents can be the same or different in a particular compound. Illustrative of suitable specific catalysts are $M(OC_6H_5)_4$, $M(OC_3H_7)_4$, $M(OC_4H_9)_4$, $M(OC_2H_5)_4$, $M(OC_2H_5)_3(OC_6H_5)$, $M(OCH_3)_3(OC_2H_5)$, $M(OCH_2C_6H_5)_4$, $M(OC_5H_4CH_3)_4$, and $M(OCH_3)(OC_2H_5)(OC_6H_5)(OC_4H_9)$.

The preferred catalysts are the alkyl titanates wherein the alkyl group contains from 1 to 20 carbon atoms; and the titanium acylates. Some commercially available titanium acylates are represented by the formula $(R^5O)_3TiOR^4$ wherein $R^5$ is an alkyl radical or is hydrogen and $R^4$ is an acyl radical. The most preferred transesterification catalyst for the present invention is tetraisopropyltitanate. In addition, various known polymeric titanates and zirconates obtained by the partial hydrolysis and condensation of the above-described monomeric titanates or zirconates can be employed.

Generally, the polythiol of (i) and the polyene of (ii) are used in stoichiometric amounts. The amounts, by weight, of the silicone modified polyester copolymer, the polythiol and the polyene present in the coating composition generally range from about 1 part by weight of the silicone modified polyester copolymer to about 3 parts by weight of the combined weight of the polythiol and the polyene to from about 3 parts by weight of the silicone modified polyester copolymer to about 1 part by weight of the combined weight of the polythiol and the polyene; preferably from about 1 part by weight of the silicone modified polyester copolymer to about 2 parts by weight of the combined weight of the polythiol and the polyene to from about 2 parts by weight of the silicone modified polyester copolymer to about 1 part by weight of the combined weights of the polythiol and polyene; and more preferably from about 1 part by weight of the silicone modified polyester copolymer to about 1 part by weight of the combined weights of the polythiol and polyene.

The photocurable composition may be formulated for use as 100 percent solids, or disposed in organic solvents, or as dispersions or emulsions in aqueous media, prior to curing.

The curable coating compositions, if in liquid form, prior to curing may readily be pumped, poured, siphoned, brushed, sprayed, doctored, or otherwise handled as desired. Following application, curing in place to the polycarbonate article may be effected either very rapidly or extremely slowly as desired by manipulation of the compounding ingredients and the method of curing.

The curing reaction may be initiated by most actinic light sources that disassociate or abstract a hydrogen atom from an SH group, or accomplish the equivalent thereof. Generally, the rate of the curing reaction may be increased by increasing the temperature of the composition at the time of initiation of cure. In many applications, however, the curing is accomplished conveniently and economically by operating at ordinary room temperature conditions.

By proper choice of type and concentration of photocuring rate accelerator for initiation, the curing period required for conversion of the polythiol-polyene-silicon modified polyester copolymer composition from the liquid to the solid state may be varied greatly as desired. In combination with suitable accelerators or retarders, the curing period may vary from about a second or less to about 30 days or more. In general, short curing periods are achieved in applications where thin films of curable compositions are required, such as in the field of coatings whereas the long curing periods are achieved and desired where more massive layers of composition are required. such as in the field of elastomeric sealants.

A class of actinic light useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable coating composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol.

Conventional curing inhibitors or retarders which may be used in order to stabilize the components or curable compositions so as to prevent premature onset of curing may include hydroquinone; p-tert-butyl catechol; 2,6-di tert-butyl-p-methylphenol; phenothiazine; N-phenyl-2-nephthylamine; inert gas atmosphere such as helium, argon, nitrogen and carbon dioxide; vacuum; and the like.

It is understood to be within the scope of this invention that the photocuring rate accelerator may be present as a separate and distinct component such as azobenzene, as a mixture of two or more separate components, such as benzophenone; benzanthrone; anthrone and dibenzosuberone; carbon tetrachloride and phenanthrene; and the like, or in chemically combined form within the molecular structure of either the polyene or the polythiol.

Specifically useful herein are chemical photocuring rate accelerators such as benzophenone, acetophenone, acenaphthenequinone, o-methoxy benzophenone, thioxanthen-9-one, xanthen-9-one, 7H-Benz(de)anthracen-7one, dibenzosuberone, 1-naphthaldehyde, 4,4'-bis (dimethylamino) benzophenone, fluorene-9-one, 1'-acetonahpthane, anthraquinone, 1-indanone, 2-tert-butyl anthraquinone, valerophenone, hexanophenone, 3-phenyl-butyrophenone, p-morpholinopropiophenone, 4-morpholino-benzophenone, p-diacetyl-benzene, 4-amino-benzophenone, 4'-methoxyacetophenone, benzaldehyde, α-tetralone, 9-acetylphenanthrene, 2-acetylphenanthrone, 10-thioxanthenone, 3-acetylphenanthrene, 3-acetylindole, 1,3,5-triacetylbenzene and the like, including blends thereof, to greatly reduce the exposure times.

The curing rate accelerators are usually added in an amount ranging from about 0.005 to about 50 percent by weight of the photocurable composition, with a preferred range being from about 0.05 to about 25 percent by weight. Preferred photocuring rate accelerators are the aldehyde and ketone carbonyl compounds having at least one aromatic nucleus attached directly to the

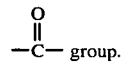

The compositions to be cured, i.e., (converted to solid resins or elastomers) in accord with the present invention may, if desired, include such additives as antioxidants, accelerators, dyes, inhibitors, activators, fillers, pigments, antistatic agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably about 0.0005 to about 300 parts on the same basis.

A useful method of compounding is to prepare in an ambient atmosphere by conventional mixing techniques but in the absence of actinic radiation a composition consisting of polyene, antioxidant (to inhibit spontaneous oxygen-initiated curing), polythiol, silicone modified polyester copolymer, UV sensitizer or photoinitiator, and other inert additives. This composition may be stored in the dark for extended periods of time, but on exposure to actinic radiation (e.g., ultraviolet light, sunlight, etc.) will cure controllably and in a very short time period to solid polythioether products.

The coating composition of the instant invention may be applied to the polycarbonate surface by any conventional coating technique such as roll, curtain or spray.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)propane), bis (4-hydroxyphenyl) methane, 2,2-bis(4-hydroxy-3-methylphenyl) propane, 4,4-bis(4-hydroxyphenyl) heptane, 2,2-(3,5,3', 5'-tetrachloro-4,4'-dihydroxydiphenyl) propane, 2,2-(3,5,3', 5'-tetrabromo-4,4'-dihydroxydiphenyl) propane, (3,3'-dichloro-4,4'-dihydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate di-(chloronaphthyl) carbonate, phenyl tolyl carbonate chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-T, paratertiarybutylphenyl, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine tripropylamine, N,N-dimethylaniline, quaternary ammonium compounds such as, for example, tetraethylammonium bromide, xetyl triethyl ammonium bromide, tetra-n-heptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE 1

A sample of a polycarbonate of 2,2'-bis-(4-hydroxyphenyl) propane having an intrinsic viscosity of 0.57 deciliters is molded into test specimens of $4''\times4''\times\frac{1}{4}''$ and tested for toughness and stress-crazing.

The toughness of the specimen is determined by moving the fingernails of a hand back and forth across the test specimen with mecium pressure and observing whether or not the coating scratches.

The stress-crazing of the $4''\times4''$ specimen is determined by placing it on a material, such as an equivalent size of carpet, placing a steel ball in the center of the combination and applying a load plate of 100 lbs. to the steel ball. The sample is allowed to remain under stress for 7 days. The sample of polycarbonate is then examined around the stress point for any sign of stress crazing.

The polycarbonate of this example is molded into a test specimen of $10''\times10''\times\frac{1}{4}''$ and tested for its anti-skid properties. The anti-skid rating is determined by placing three $\frac{5}{8}''$ diameter steel balls, welded together to form a triangle, on the test specimen and raising one end of the specimen vertically while keeping the opposite end on the horizontal plane. The distance in inches to which the edge is raised vertically when the weight slides down the sample is recorded. A value of 7–8 is considered acceptable.

The test results are summarized in Table I.

EXAMPLE 2

Sheets of $4''\times4''\times\frac{1}{4}''$ and $10''\times10''\times\frac{1}{4}''$, made from the polycarbonate of Example 1, are coated with a coating which is a mixture of a stoichiometric amount of a thiol of the formula:

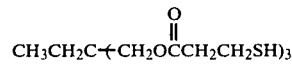

and a polyene of the formula:

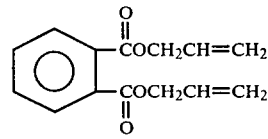

in a thickness in the range of 0.5 mils to 2.5 mils and cured with ultraviolet light for 60 seconds. The coated sheets are tested as described in Example I and also tested for coating adhesion.

The coating adhesion is measured on the coated sheet with scotch tape. In the unscribed coating adhesion test, a strip of scotch tape is applied to the surface of the coating, taking care to hold one end of the strip away from the surface. The tape is removed rapidly by pulling the free end at a 90° angle away from the surface. Removal of the coating with the tape is considered adhesion failure. In the scribed coating adhesion test, the coating surface is scribed with a sharp instrument such as a razor blade or a Gardner cross-cut (lattice cutting) tester. The scribed area consists of two sets of parallel scribes 1-2 mm. apart, perpendicular to each other. The scotch tape is applied (as above) over the scribed area and removed in the same manner as above. The coating is then examined for partial or complete removal of the squares or no change.

EXAMPLE 3

Sheets of 4"×4"×¼" and 10"×10"×¼" made from the polycarbonate of Example 1, are coated with a coating which is a mixture of a stoichiometric amount of the thiol of Example 2 and a polyene of the formula:

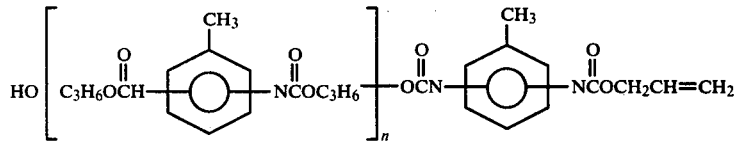

where n is an integer wherein the molecular weight is equal to 1000, in a thickness in the range of 0.5 mils to 2 5 mils and cured with ultraviolet light for 60 seconds. The coated sheets are tested as described in Examples 1 and 2. The results are set forth in Table I.

EXAMPLE 4

To a reaction vessel equipped with a stirrer, a fractionation column packed with glass helices, a Dean-Stark trap, and a condenser are added 213.30 parts of maleic anhydride, 202.74 parts of trimethylolpropane monoalkyl ether, and 183.96 parts of diethylene glycol. The reaction mass is heated under a nitrogen atmosphere to a maximum temperature of 200° C. After about 4½ hours, a total of 33 parts of water of esterification are collected. The reaction mass is cooled to room temperature and about 567 parts of an unsaturated polyester having an acid number of 32 are obtained.

169 parts of this polyester and 60 parts of xylene are added to a reaction vessel equipped with a stirrer, a fractionation column packed with glass helices, a Dean-Stark trap, and a condenser. The reaction mixture is heated to 110° C. in about 10 minutes at which time 76 parts of a methoxy chain-stopped linear polysiloxane containing phenyl and methyl groups, 7% by weight silicon-bonded methoxy groups, and a viscosity of 1500-3000 centistokes at 25° C.; 25 parts of xylene and 0.38 parts of tetraisopropyl titanate are added to the reaction vessel. The reaction mass is heated under a nitrogen atmosphere to a maximum temperature of 152° C. After about 2½ hours, 6 parts of methanol are collected and external heating of the reaction is stopped. The reaction mass is distilled under vacuum at a pressure of 20 mm Hg to a maximum temperature of 145° C. to remove the xylene. About 239 parts of a clear copolymer containing 70 weight percent of the unsaturated polyester and 30 weight percent of the organopolysiloxane are obtained.

EXAMPLE 5

Sheets of 4"×4"×¼" and 10"×10"×¼" made from the polycarbonate of Example I are coated with a coat-ing which contains a mixture of (i) 50 gms. of a mixture of a stoichiometric amount of the thiol of Example 2 and a stoichiometric amount of a polyene having the formula

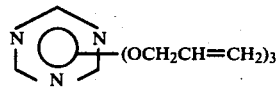

and (ii) 50 gms. of the silicone modified polyester copolymer prepared substantially in accordance with Example 4 and cured with ultraviolet light for 60 seconds to give a cured coating about 1-2 mils in thickness. The coated sheets are tested as described in Examples 1 and 2. The results are set forth in Table I.

TABLE I

|  | Example 1 | Example 2 | Example 3 | Example 5 |
|---|---|---|---|---|
| Toughness | Pass | Fail | Pass | Pass |
| Stress Crazing | Fail | Pass | Fail | Pass |
| Anti-Skid | 3–4 | 6–8 | 7–8 | 7–8 |
| Adhesion | N/A | Pass | Fail | Pass |

Although the above examples have shown various modifications of the present invention, other variations are possible in the light of the above teachings. It is therefore to be understood that changes may be made in the particular embodiments of the invention described which are within the full intended scope of the invention as defined by the appended claims.

What is claimed is:
1. A photocurable coating composition comprising:
   (i) a polythiol represented by the general formula:

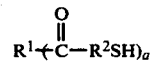

wherein $R^1$ and $R^2$ are organic moieties containing no reactive carbon-to-carbon unsaturation and a is 2 to 4;
   (ii) a polyene represented by the general formula:

wherein $R^3$ is an organic moiety containing no reactive carbon-to-carbon unsaturation; and,
   (iii) a silicone modified polyester copolymer which is the reaction product of:
      a. a hydroxyl terminated unsaturated polyester of:
         1. polycarboxylic acid reactant wherein at least about 65 mole percent of said polycarboxylic acid reactant is an α, β-ethylenically unsaturated polycarboxylic reactant and up to about 35 mole percent of said polycarboxylic acid reactant is a polycarboxylic acid reactant free from non-benzenoid unsaturation; and, 2. an alcohol reactant containing two terminal hydroxyl groups and a member selected from the group consisting of allyl ether groups methallyl ether groups and mixtures thereof in an amount sufficient to provide at least 0.1 mole of said ether groups per mole of said ethylenically unsaturated polycarboxylic acid reactant; and, 3. wherein said polyester has an acid number from about 10 to about 35; and, b. an organopolysiloxane having the average unit formula

wherein R is selected from the group of lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; R' is selected from the group of alkyl radicals containing 1 to 8 carbon atoms; mononuclear aryl radicals; acyl radicals of 1 to 8 carbon atoms; s has a value of 1.0 to 2.0; q has a value of 0 to 1.0; r has a value of 0 to 1.0; the sum of q+r has a value of 0.01–1.0; and, said organopolysiloxane containing at least 0.25% by weight of OH or OR' groups or a mixture of said OH and OR' groups; said coating composition containing, in parts by weight, from about 1 parts of (iii) to about 3 parts of the combined weights of (i) and (ii) to from about 3 parts of (iii) to about 1 part of the combined weights of (i) and (ii).

2. The coating composition of claim 1 wherein said polythiol is represented by the general formula

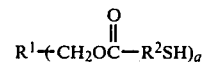

wherein $R^1$ and $R^2$ are straight chain aliphatic moieties containing no reactive carbon-to-carbon unsaturation and a is 2 to 4.

3. The coating composition of claim 2 wherein $R^1$ and $R^2$ are straight chain aliphatic moieties containing no reactive carbon-to-carbon unsaturation and containing from 1 to about 20 carbon atoms.

4. The coating composition of claim 1 wherein said polythiol is represented by the formula:

5. The coating composition of claim 1 wherein said polyene is represented by the formula

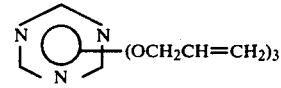

6. The coating composition of claim 5 wherein said polyene is represented by the formula:

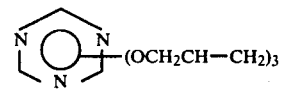

7. The coating composition of claim 1 wherein said polyene and polythiol are present in stoichiometric amounts.

8. The coating composition of claim 7 wherein said composition contains, in parts by weight, from about 1 part of said silicone modified polyester copolymer to about 2 parts of the combined weights of said polythiol and polyene to from about 2 parts of said silicone modified polyester copolymer to about 1 part of the combined weights of said polythiol and polyene.

* * * * *